United States Patent
Tandon

(10) Patent No.: US 10,329,491 B2
(45) Date of Patent: Jun. 25, 2019

(54) METHOD AND RETORT VESSEL FOR ENABLING CONTINUOUS THERMAL OR THERMO-CATALYTIC DEGRADATION OF MIXED WASTE PLASTIC FEEDSTOCK

(71) Applicant: Amit Tandon, Panchkula (IN)

(72) Inventor: Amit Tandon, Panchkula (IN)

(73) Assignee: Amit Tandon, Haryana (IN)

( * ) Notice: Subject to any disclaimer, the term of this patent is extended or adjusted under 35 U.S.C. 154(b) by 217 days.

(21) Appl. No.: 14/910,262

(22) PCT Filed: Aug. 7, 2014

(86) PCT No.: PCT/IB2014/063767
§ 371 (c)(1),
(2) Date: Feb. 5, 2016

(87) PCT Pub. No.: WO2015/019313
PCT Pub. Date: Feb. 12, 2015

(65) Prior Publication Data
US 2016/0177186 A1  Jun. 23, 2016

(30) Foreign Application Priority Data

Aug. 9, 2013 (IN) .......................... 2381/DEL/2013

(51) Int. Cl.
| | |
|---|---|
| *C10G 1/10* | (2006.01) |
| *C10B 47/30* | (2006.01) |
| *C10B 53/07* | (2006.01) |

(52) U.S. Cl.
CPC ............... *C10G 1/10* (2013.01); *C10B 47/30* (2013.01); *C10B 53/07* (2013.01); *Y02P 20/143* (2015.11)

(58) Field of Classification Search
CPC ........... C10G 1/10; C10B 53/07; C10B 47/30; Y02P 20/143
See application file for complete search history.

(56) References Cited

U.S. PATENT DOCUMENTS

| | | | | |
|---|---|---|---|---|
| 4,746,406 A | * | 5/1988 | Timmann | C10B 47/24 201/25 |
| 5,798,394 A | * | 8/1998 | Myers | C08J 11/16 521/41 |

FOREIGN PATENT DOCUMENTS

JP   2004045013   *   2/2004   ............. F26B 17/34

OTHER PUBLICATIONS

Laresgoiti, M.F. et al. (2000) Journal of Analytical and Applied Pyrolysis, 55, 43-54.*

* cited by examiner

*Primary Examiner* — Brian A McCaig

(57) ABSTRACT

A method and retort vessel for enabling continuous thermal or thermo-catalytic degradation of mixed waste plastic feedstock. The method includes receiving the feedstock into a rotary retort vessel. The feedstock is heated in the retort vessel, such that the resultant reaction products ultimately exit the retort vessel either as gaseous vapor or as solid residue, wherein the gaseous vapor exits the retort vessel at a temperature exceeding 400° C. Further, the retort vessel is configured such that the resultant reaction products exit an output end of the retort vessel. The retort vessel is configured to provide a degradation time chosen between 0.5 minutes and 50 minutes, wherein the degradation time is defined as the ratio of available volume inside the retort vessel to the volumetric flow rate of gaseous vapor at the output end of the retort vessel.

18 Claims, 2 Drawing Sheets

METHOD AND RETORT VESSEL FOR ENABLING CONTINUOUS THERMAL OR THERMO-CATALYTIC DEGRADATION OF MIXED WASTE PLASTIC FEEDSTOCK

BACKGROUND

Field

The disclosed subject matter relates to the field of chemical recycling of mixed waste plastics. More particularly but not exclusively, the subject matter relates to thermal or thermo-catalytic degradation of mixed waste plastic feedstock to obtain lower molecular weight hydrocarbon products.

Discussion of Related Field

Several conventional technologies have attempted thermal or thermo-catalytic pyrolysis of heterogenous waste plastic feedstock to obtain lower molecular weight hydrocarbon products. Generally, mixed waste plastic feedstock obtained from municipal, commercial, industrial and agricultural waste streams comprises polymer resins, such as, high-density polyethylene (HDPE), low-density polyethylene (LDPE), polypropylene (PP), polystyrene (PS), polyvinyl chloride (PVC), polyvinylidene chloride (PVDC), polyethylene terephthalate (PET), as well as, other engineering resins, and may be contaminated with some amount of metal, cellulosic biomass, paper, organic matter, dirt and other materials. The mixed waste plastic feedstock is suitably pre-processed to obtain a hydrocarbon rich stream, which is then pyrolysed. The pyrolysis of the hydrocarbon rich mixed waste plastic stream results in formation of a wide range of hydrocarbon products. The resultant hydrocarbon products can be divided into three major streams, namely, a volatile gas fraction, a liquid petroleum fraction and a solid residue fraction. The volatile gas fraction comprises hydrocarbon chains, each having 1 to 5 carbon atoms. The liquid petroleum fraction, which includes paraffins, olefins, iso-paraffins, naphthenes and aromatics, comprises hydrocarbon chains, each having at least 5 carbon atoms. The solid residue fraction comprises carbon char and other non-volatile reaction products coming from the pyrolytic process.

To enhance the commercial profitability of chemical recycling of mixed waste plastic feedstock, it is desirable that a substantial part of the generated liquid petroleum fraction be physicochemically similar to distillate fuels, such as, gasoline, kerosene and diesel. It is well known that such distillate fuels comprise hydrocarbon chains, which mostly have 5 to 24 carbon atoms linked together. However, it has been observed that, chemical recycling of mixed waste plastic feedstock often yields a very broad compositional range of liquid hydrocarbon mixtures, starting from $C_5$ (n-, iso and neo-pentane) and extending all the way up to $C_{80}$ and beyond. Such resultant product is often referred to as 'synthetic crude' and it includes a substantially large amount of petroleum waxes and slurries, which comprises hydrocarbon chains having over 24 carbon atoms linked together. Consequently, such synthetic crude oil has high viscosity, low API and a lower economic value compared to distillate fuels, such as, gasoline, kerosene, and diesel.

For example, U.S. Pat. No. 7,758,729 describes a method for degradation of mixed waste plastic feedstock wherein "plastic material is heated in a vertical kiln treatment chamber in incremental steps through a series of graduated temperature set points wherein each graduated temperature set point corresponds to a vaporization temperature of an individual by-product of said plastic material, and pulling a vacuum of inert gas on the treatment chamber at each temperature set point to selectively remove an individual by-product corresponding to the temperature set point." Application of such a method converts mixed waste plastic feedstock into high viscosity 'synthetic crude' oil having a carbon number distribution which extends from $C_5$ to $C_{80}$.

In light of the foregoing discussion, there is a need for an improved technique to chemically recycle mixed waste plastic feedstock, for generation of lower molecular weight hydrocarbon products.

SUMMARY

An embodiment provides a method for enabling continuous thermal or thermo-catalytic degradation of mixed waste plastic feedstock. The method includes receiving the feedstock into a rotary retort vessel; heating the feedstock in the retort vessel, such that the resultant reaction products ultimately exit the retort vessel either as gaseous vapor or as solid residue, wherein the gaseous vapour exit the retort vessel at a temperature exceeding 400° C.; configuring the retort vessel such that the resultant reaction products exit an output end of the retort vessel; and providing a degradation time chosen between 0.5 minutes and 50 minutes, wherein the degradation time is defined as the ratio of available volume inside the retort vessel to the volumetric flow rate of gaseous vapor at the output end of the retort vessel.

Another embodiment provided a rotary retort vessel for enabling continuous thermal or thermo-catalytic degradation of mixed waste plastic feedstock. The retort vessel includes an input end and an output end. The retort vessel is configured to receive the feedstock into a retort vessel at an input end; heat the feedstock in the retort vessel, such that the resultant reaction products ultimately exit the retort vessel, either as gaseous vapor or as solid residue, wherein the resultant reaction products exit the retort vessel at a temperature exceeding 400° C.; facilitate movement of the feedstock and the resultant reaction products towards the output end of the retort vessel; discharge the feedstock and the resultant reaction products from the output end of the retort vessel; and provide a degradation time chosen between 0.5 minutes and 50 minutes, wherein the degradation time is defined as the ratio of available volume inside the retort vessel to the volumetric flow rate of gaseous vapor at the output end of the retort vessel.

BRIEF DESCRIPTION OF DRAWINGS

Embodiments are illustrated by way of example and not limitation in the Figures of the accompanying drawings, in which like references indicate similar elements and in which.

DETAILED DESCRIPTION

Figure 1:
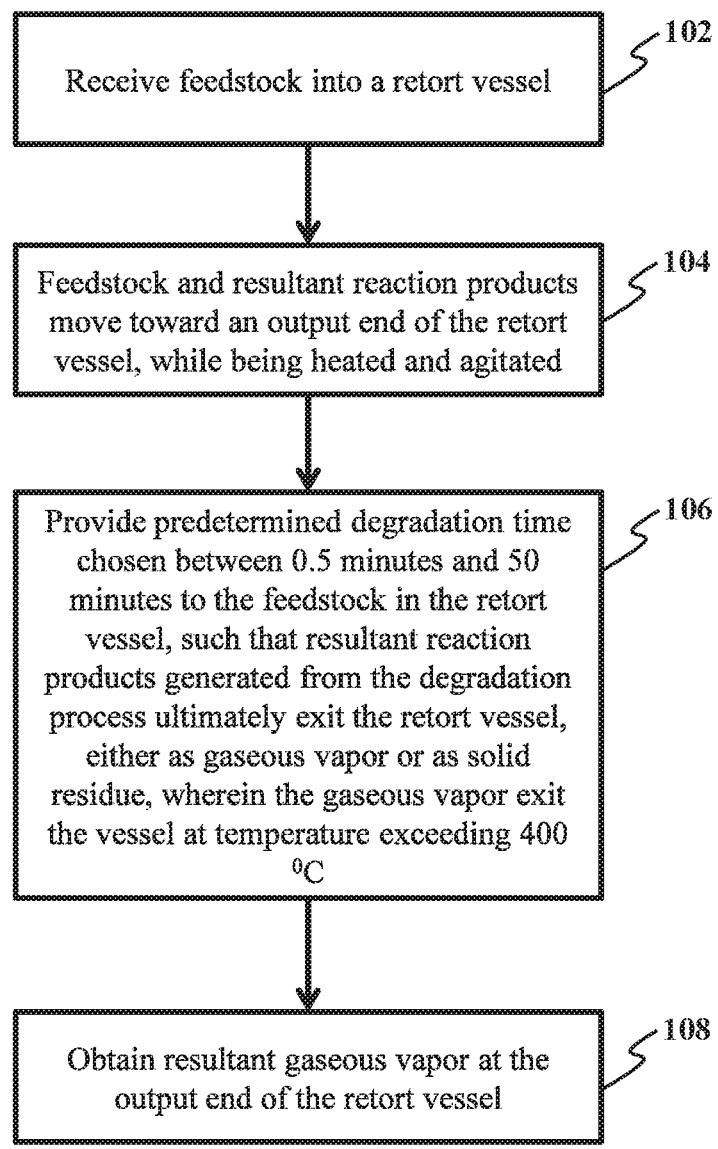
FIG. 1 is a flow chart of an exemplary method for enabling continuous thermal or thermo-catalytic degradation of mixed waste plastic feedstock, in accordance with an embodiment.

I. OVERVIEW
II. EXEMPLARY FEEDSTOCK
III. EXEMPLARY PRE-PROCESSING OF FEEDSTOCK
IV. EXEMPLARY RETORT VESSEL

V. EXEMPLARY METHOD
VI. EXAMPLE
VII. CONCLUSION

I. Overview

Embodiments relate to the field of thermal or thermo-catalytic degradation of mixed waste plastic feedstock, for generation of lower molecular weight hydrocarbon products.

In an embodiment, the mixed waste plastic feedstock is continuously degraded in a heated retort vessel. The retort vessel is aerobically sealed and configured to rotate about its longitudinal axis. An input end of the retort vessel is configured to deliver the mixed waste plastic feedstock into the retort vessel. The feedstock is heated and thermally degraded in the retort vessel, such that, resultant reaction products ultimately exit, either as gaseous vapor or as solid residue, from an output end of the retort vessel with the gaseous vapour exiting the output end of the retort vessel at a temperature exceeding 400° C. The retort vessel is designed and configured to provide a degradation time chosen between 0.5 minute and 50 minutes in the retort vessel. The degradation time is defined as the ratio of available volume inside the retort vessel to the volumetric flow rate of vapors at the output end of the retort vessel.

The following detailed description includes references to the accompanying drawings, which form a part of the detailed description. The drawings show illustrations in accordance with example embodiments. These example embodiments are described in enough detail to enable those skilled in the art to practice the present subject matter. However, it will be apparent to one of ordinary skill in the art that the present invention may be practiced without these specific details. In other instances, well-known methods, procedures and components have not been described in detail so as not to unnecessarily obscure aspects of the embodiments. The embodiment can be combined, other embodiments can be utilized or structural and logical changes can be made without departing from the scope of the invention. The following detailed description is, therefore, not to be taken as a limiting sense.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

II. Exemplary Feedstock

Embodiments disclose thermal or thermo-catalytic degradation of mixed waste plastic feedstock. Mixed waste plastic feedstock, for example, can include, mixed waste plastics obtained from municipal, commercial, industrial and agricultural waste streams.

Mixed waste plastic feedstock obtained from the aforementioned waste streams includes polymer resins, such as, high-density polyethylene (HDPE), low-density polyethylene (LDPE), polypropylene (PP), polystyrene (PS), polyvinyl chloride (PVC), polyvinylidene chloride (PVDC), polyethylene terephthalate (PET), as well as, other engineering resins and may be contaminated with some amount of metal, cellulosic biomass, paper, organic matter, dirt and other materials.

III. Exemplary Pre-Processing of Feedstock

In an embodiment, the mixed waste plastic feedstock is segregated into undesirable material, which comprises of feedstock material having substantial amount of N,S,X,O hetero-atoms and desirable material, which comprises of feedstock material, which is largely hydrocarbonaceous (such as HDPE, LDPE, PP, PS) and which may include a small amount of N,S,X,O contamination. Such segregation is achieved using methods well known in art, including, methods such as manual separation, sink-floatation, froth floatation, density separation, weight separation after identification on the basis of absorption or reflection spectra and electrostatic sorting. Thereafter, the segregated desirable material is subjected to thermal or thermo-catalytic degradation.

In an embodiment, the mixed waste plastic feedstock or the segregated desirable material may be subjected to further processing, such as, shredding (size reduction, for example to size chosen between 8 mm and 40 mm) or densification (density improvement) to increase its bulk density. Such material having higher bulk density may thereafter be thermally decontaminated in a reactor by heating it to a temperature between 250° C. and 360° C., and washing separately the overhead gases generated, which comprise of N,S,X,O hetero-atoms. The resultant feedstock material left in the reactor is substantially free of N,S,X,O impurities and may be subjected to chemical recycling for generation of lower molecular weight hydrocarbon products.

Figure 2:
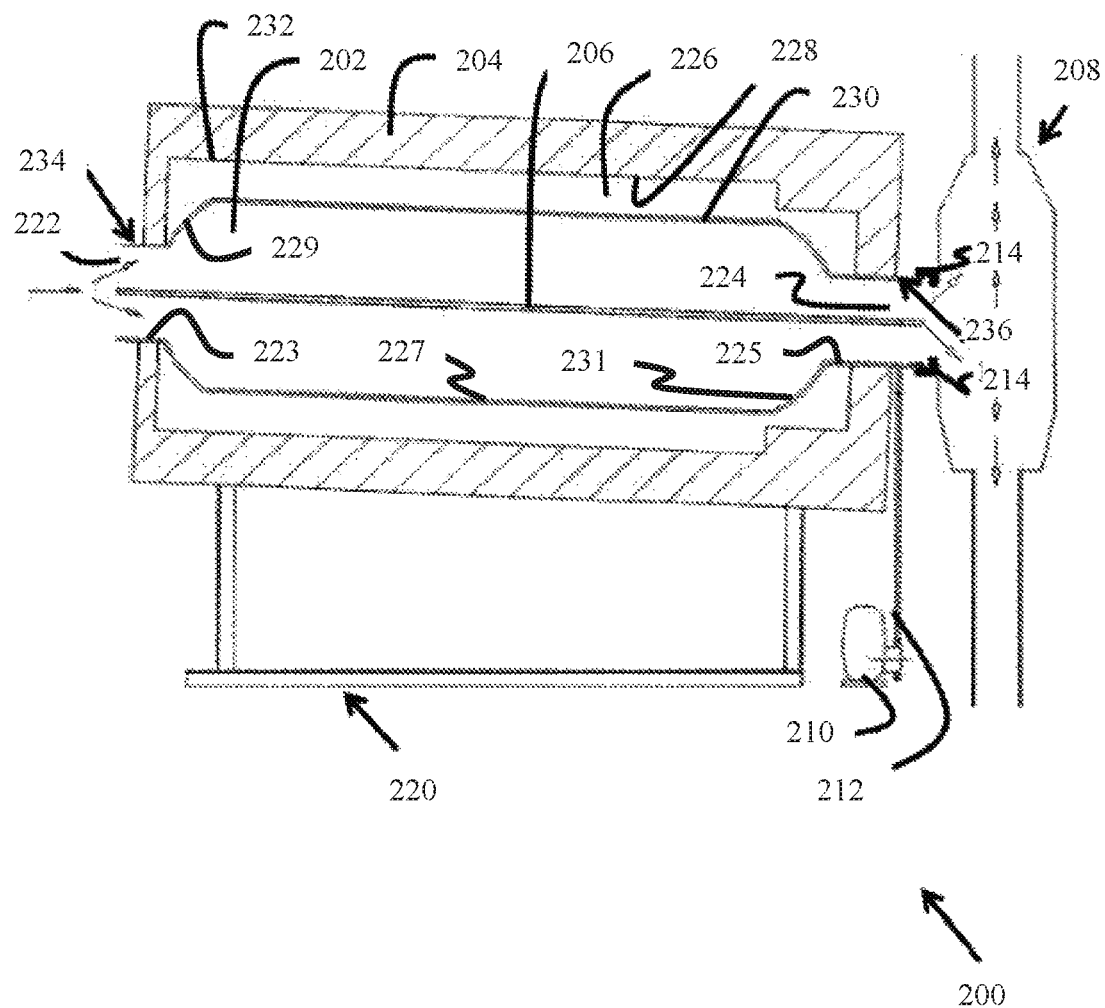
FIG. 2 is a schematic cross sectional side view of a pyrolysis reactor 200 for enabling thermal degradation of feedstock, in accordance with an embodiment.

Referring to FIG. 2, a schematic cross sectional side view of a pyrolysis reactor 200 for enabling thermal degradation of feedstock is provided, in accordance with an embodiment. The pyrolysis reactor 200 includes a rotary retort vessel 202, an insulation structure 204, a shell 232, a partition structure 206, a motor 210, a belt 212, a leak-proof seal 214, tilting mechanism 220 and a roller arrangement. The rotating vessel 202 is supported by multiple roller assemblies, which may be positioned along the base of the rotary nose 234 and 236. The rotary retort vessel 202, and thereby the feedstock, may be heated either directly by pressurized, high-velocity flame burners, which push large volume of heated air into the empty space 226 or indirectly by circulation of hot air or other such media coming from a generator into the empty space 226. The empty space 226 is defined between the inner surface 228 of the shell 232 and outer surface 230 of the rotary retort vessel 202.

The rotary retort vessel 202 includes an input cylindrical portion 223 of uniform diameter disposed towards the input end 222, an output cylindrical portion 225 of uniform diameter disposed towards the output end 224 and an intermediate cylindrical portion 227 of uniform diameter. The rotary retort vessel 202 further includes a first tapered portion 229 and a second tapered portion 231. The first tapered portion 229 connects the input cylindrical portion 223 to the intermediate cylindrical portion 227. The second tapered portion 231 connects the intermediate cylindrical portion 227 to the output cylindrical portion 225. The internal diameter of the intermediate cylindrical portion 227 is greater than the internal diameter of the output cylindrical portions 224. The partition structure 206 is a flat plate that extends continuously along the length of the rotary retort vessel 202 from the input end 222 to the output end 224, and is of a width equal to the inner diameter of the rotary retort vessel 202. The gas-residue separator 208 is engaged at the output end 224 of the rotary retort vessel 202, wherein the partition structure 206 extends up to the output end 224.

IV. Exemplary Retort Vessel

The rotary retort vessel 202 for enabling continuous thermal or thermo-catalytic degradation of mixed waste plastic feedstock is provided. The retort vessel 202 is configured to operate horizontally and has an input end 222 and an output end 224. The output end 224 is declined with respect to the input end and may be engaged with downstream process equipment such as a gas-residue separator 208. The input end 222 is configured to deliver the mixed waste plastic feedstock into the retort vessel 202. Further, the retort vessel 202 is air-sealed and is configured to be heated, such that, the incoming mixed waste plastic feedstock is thermally degraded in the retort vessel 202 to generate resultant reaction products, which ultimately exit either as gaseous vapor or as solid residue, at an output end 224 of the retort vessel, where the output end of the retort vessel is configured to discharge the resultant reaction products from the retort vessel 202. Such resultant gaseous vapor exits the output end of the retort vessel 202 at a temperature exceeding 400° C. The retort vessel 202 is angularly rotated, thereby facilitating better heat distribution to the incoming feedstock and resultant reaction products.

In an embodiment, the retort vessel is declined at an angle, thereby enabling the feedstock and the resultant reaction products to move towards an output end of the retort vessel, which is configured to discharge such reaction products from the retort vessel.

The retort vessel is configured to provide a desired degradation time to allow for optimal thermal degradation of the feedstock and the resultant reaction products. The degradation time is defined as the ratio of available volume inside the retort vessel to the volumetric flow rate of gaseous vapors at the output end of the retort vessel.

In an embodiment, the degradation time is chosen between 0.5 minute and 50 minutes.

In another embodiment, the degradation time is chosen between 1 minute and 20 minutes.

In an embodiment, the retort vessel includes at least one partition structure. The partition structure facilitates movement of resultant non-gaseous reaction product towards the output end of the retort vessel and its eventual discharge from the retort vessel.

The degradation time (τ) can be described by the following correlation:

Degradation time (τ)~f(Length)

The degradation time is directly correlated to length (L) of the retort vessel.

In an embodiment the retort vessel is designed such that the length (L) of the retort vessel may be chosen between 2 meters and 12 meters.

In an embodiment, the retort vessel is designed such that L/D is between 2 and 8, wherein D is the diameter of the retort vessel.

The degradation time is inversely proportionate to the temperature, and can be defined by the below correlation:

Degradation time (τ)~f(1/Temperature)

V. Exemplary Method

FIG. 1 is a flow chart of an exemplary method for enabling continuous thermal or thermo-catalytic degradation of mixed waste plastic feedstock, in accordance with an embodiment. In an embodiment, at step 102, the mixed waste plastic feedstock is received into the rotary retort vessel for thermal or thermo-catalytic degradation. The retort vessel is air-sealed, configured to be heated, as also configured to discharge the resultant reaction products from the output end of the retort vessel. As indicated in step 104, the feedstock and resultant reaction products move towards the output end of the reactor vessel. Further, as indicated in step 106, the feedstock is provided a degradation time chosen between 0.5 minutes and 50 minutes, and heated such that, resultant reaction products generated from the degradation process ultimately exit the retort vessel, either as gaseous vapor or as solid residue. The gaseous vapor exits the retort vessel at temperature exceeding 400° C. at the output end, as indicated at step 108.

In an embodiment, the mixed waste plastic feedstock is segregated into undesirable material, which comprises of feedstock material having substantial amount of N,S,X,O hetero-atoms and desirable material, which comprises of feedstock material which is largely hydrocarbonaceous (such as HDPE, LDPE, PP, PS) and which may include a small amount of N,S,X,O contamination. Such segregated desirable material is thereafter subjected to further processing such as shredding (size reduction) or densification (density improvement), which may be followed by thermal decontamination of the pre-processed desirable material at temperatures less than 360° C. and washing the generated organic and inorganic gases which comprise of N,S,X,O hetero-atoms. The resultant polymeric material which is liquefied and substantially decontaminated is subjected to chemical recycling for obtainment of lower molecular weight hydrocarbon products.

In an embodiment, as indicated at step 104, the feedstock received at the input end and the reaction products generated from the thermal degradation process move towards the output end of the retort vessel as a result of rotation and declination of the retort vessel.

In an embodiment, declination provided to the retort vessel is chosen between 1° and 5°.

In an embodiment, the angular velocity of the retort vessel is chosen between 0.1 RPM and 10 RPM.

Further, as indicated in step 106, the retort vessel is designed and configured to provide a degradation time chosen between 0.5 minutes and 50 minutes in the retort vessel.

In another embodiment, the retort vessel is designed and configured to provide a degradation time chosen between 1 minute and 20 minutes in the retort vessel.

The retort vessel is configured to be heated such that the resultant reaction products ultimately exit the retort vessel at the output end of the retort vessel either as gaseous vapor or solid residue, wherein the gaseous vapor exits the retort vessel at a temperature exceeding 400° C.

In an embodiment, the retort vessel includes at least one partition structure, which facilitates movement of the feedstock and resultant reaction products towards the output end of the retort vessel.

The resultant reaction products produced as a result of thermal or thermo-catalytic degradation are obtained at the output end of the retort vessel, at step 108.

In an embodiment, the vapors that exit the output end of the retort vessel are further catalytically cracked or reformed using a fixed-bed, moving-bed or fluidized-bed catalytic reactor setup having a suitable catalyst. The catalyst promotes further scissioning (cracking) of hydrocarbon chains in the evolved vapors and the resultant reaction products are thereafter condensed to obtain hydrocarbon rich fuel oils.

In an embodiment a suitable catalyst may be added to the retort vessel along with the feedstock to enable a liquid phase thermo-catalytic degradation of mixed waste plastic feedstock.

VI. Example

| | |
|---|---|
| Feedstock | Shredded mixed waste plastics comprising of HDPE, LDPE, PP and PS. |
| Feedstock pre-treatment | Thermally decontaminating the shredded feedstock for removal of N, S, X, O contaminants. |
| Flowrate of liquified feedstock into rotary retort vessel | 10 kg/hr |
| Retort vessel parameters | rpm = 6; length = 2 m; diameter = .65 m |
| Temperature of gaseous vapors at the outlet end of retort vessel | 450° C.-465° C. |
| Degradation time | approximately 15 min |
| Carbon number distribution of resultant condensable hydrocarbon (gaseous) vapors | $C_5$-$C_{40}$: atleast 95% (v/v)<br>$C_5$-$C_{24}$: atleast 50% (v/v) |

The resultant condensable hydrocarbon vapors which exit the outlet end of the retort vessel in the above example can be further subjected to thermal or thermo-catalytic cracking using various methods well known in art, to obtain liquid fuel comprising of hydrocarbon chains, where over 80% of hydrocarbon chains in the liquid fuel are within a carbon number distribution of $C_5$ to $C_{24}$.

VII. Conclusion

It has been observed that, when mixed waste plastic feedstock comprising of a mix of HDPE, LDPE, PP and PS is subjected to thermal degradation using a rotary retort vessel configured as per the above example, a majority of the condensable portion of hydrocarbon vapors which exit the retort vessel have a carbon number distribution within the range of $C_5$ to $C_{40}$. Such hydrocarbon vapours can be further subjected to thermal or thermo-catalytic cracking using various methods well known in art, to obtain liquid fuel, comprising of hydrocarbon chains, where over 80% of hydrocarbon chains in the liquid fuel are within a carbon number distribution of $C_5$ to $C_{24}$.

The processes described above is described as sequence of steps, this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications; these should not be construed as limiting the scope of the invention but as merely providing illustrations of some of the personally preferred embodiments of this invention. Thus the scope of the invention should be determined by the appended claims and their legal equivalents rather than by the examples given.

What is claimed is:

1. A method for enabling continuous thermal or thermo-catalytic degradation of mixed waste plastic feedstock using a rotary retort vessel, the retort vessel comprising:
    an input end configured to receive the feedstock;
    an output end, wherein the rotary retort vessel is declined towards the output end with respect to the input end;
    an input cylindrical portion of uniform diameter disposed towards the input end, an output cylindrical portion of uniform diameter disposed towards the output end, an intermediate cylindrical portion of uniform diameter, a first tapered portion and a second tapered portion, wherein,
        the first tapered portion connects the input cylindrical portion to the intermediate cylindrical portion;
        the second tapered portion connects the intermediate cylindrical portion to the output cylindrical portion; and
        the internal diameter of the intermediate cylindrical portion is greater than the internal diameter of the output cylindrical portions; and
    at least one partition structure, wherein the partition structure is a flat plate that extends continuously along the length of the rotary retort vessel from the input end to the output end, and is of a width equal to the inner diameter of the rotary retort vessel;
    wherein, a gas-residue separator is engaged at the output end of the rotary retort vessel, wherein the partition structure extends up to the output end;
    the method comprising:
        receiving the feedstock into a rotary retort vessel at the input end;
        heating the feedstock in the retort vessel, such that the resultant reaction products ultimately exit the retort vessel either as gaseous vapor or as solid residue, wherein the gaseous vapour exit the retort vessel at a temperature exceeding 400° C.;
        configuring the retort vessel such that the resultant reaction products exit an output end of the retort vessel; and
        providing a degradation time chosen between 0.5 minutes and 50 minutes, as the feedstock and the resultant reactions products move over the partition structure, wherein the degradation time is defined as the ratio of available volume inside the retort vessel to the volumetric flow rate of gaseous vapor at the output end of the retort vessel.

2. The method according to claim 1, wherein the retort vessel is operated under substantially non-aerobic conditions.

3. The method according to claim 1, wherein the degradation time is chosen between 1 minute and 20 minutes.

4. The method according to claim 1, wherein the angular velocity of rotation of the retort vessel is chosen between 0.1 RPM and 10 RPM.

5. The method according to claim 1, wherein the retort vessel is declined along its longitudinal axis to an angle chosen between 1° and 5°.

6. The method according to claim 1, further comprising segregating mixed waste plastic feedstock into undesirable material, which comprises feedstock material having substantial amount of N,S, O hetero-atoms and desirable material, which comprises feedstock material, which is largely hydrocarbonaceous and which comprises a small amount of N,S, O contamination and thereafter subjecting the segregated desirable material to thermal or thermo-catalytic degradation.

7. The method according to claim 1, wherein the feedstock is shredded prior to it being received into the retort vessel.

8. The method according to claim 7, wherein the feedstock is shredded to size chosen between 8 mm and 40 mm.

9. The method according to claim 1, wherein the feedstock is densified prior to it being received into the retort vessel.

10. The method according to claim 1, wherein the feedstock is liquified prior to it being received into the retort vessel.

11. The method according to claim 1, wherein the feedstock is thermally treated for removal of volatile N,S, O based contaminants prior to it being received into the retort vessel.

12. A rotary retort vessel for enabling continuous thermal or thermo-catalytic degradation of mixed waste plastic feedstock, the retort vessel comprising:
- an input end configured to receive the feedstock;
- an output end, wherein the rotary retort vessel is declined towards the output end with respect to the input end;
- an input cylindrical portion of uniform diameter disposed towards the input end, an output cylindrical portion of uniform diameter disposed towards the output end, an intermediate cylindrical portion of uniform diameter, a first tapered portion and a second tapered portion, wherein,
  - the first tapered portion connects the input cylindrical portion to the intermediate cylindrical portion;
  - the second tapered portion connects the intermediate cylindrical portion to the output cylindrical portion; and
  - the internal diameter of the intermediate cylindrical portion is greater than the internal diameter of the output cylindrical portions; and
- at least one partition structure, wherein the partition structure is a flat plate that extends continuously along the length of the rotary retort vessel from the input end to the output end, and is of a width equal to the inner diameter of the rotary retort vessel;

wherein, a gas-residue separator is engaged at the output end of the rotary retort vessel, wherein the partition structure extends up to the output end;

wherein the retort vessel is configured to:
- receive the feedstock into the retort vessel at the input end;
- heat the feedstock in the retort vessel, such that the resultant reaction products ultimately exit the retort vessel, either as gaseous vapor or as solid residue, wherein the resultant reaction products exit the retort vessel at a temperature exceeding 400° C.;
- facilitate movement of the feedstock and the resultant reaction products towards the output end of the retort vessel;
- discharge the feedstock and the resultant reaction products from the output end of the retort vessel; and
- provide a degradation time chosen between 0.5 minutes and 50 minutes, as the feedstock and the resultant reactions products move over the partition structure, wherein the degradation time is defined as the ratio of available volume inside the retort vessel to the volumetric flow rate of gaseous vapor at the output end of the retort vessel.

13. The retort vessel according to claim 12, wherein the retort vessel is operated under substantially non-aerobic conditions.

14. The retort according to claim 12, wherein the degradation time is chosen between 1 minute and 20 minutes.

15. The retort according to claim 12, wherein the angular velocity of rotation of the retort vessel is chosen between 0.1 RPM and 10 RPM.

16. The retort according to claim 12, wherein the retort vessel is declined along its longitudinal axis to an angle chosen between 1° and 5°.

17. The retort vessel according to claim 12, wherein the length of the retort vessel is chosen between 2 meters and 12 meters.

18. The retort vessel according to claim 12, wherein the ratio between length and diameter of the retort vessel is chosen between 2 and 8.

\* \* \* \* \*